J. WALTON.
LOCOMOTIVE TRUCK.
APPLICATION FILED JAN. 4, 1911.
1,025,600.
Patented May 7, 1912.
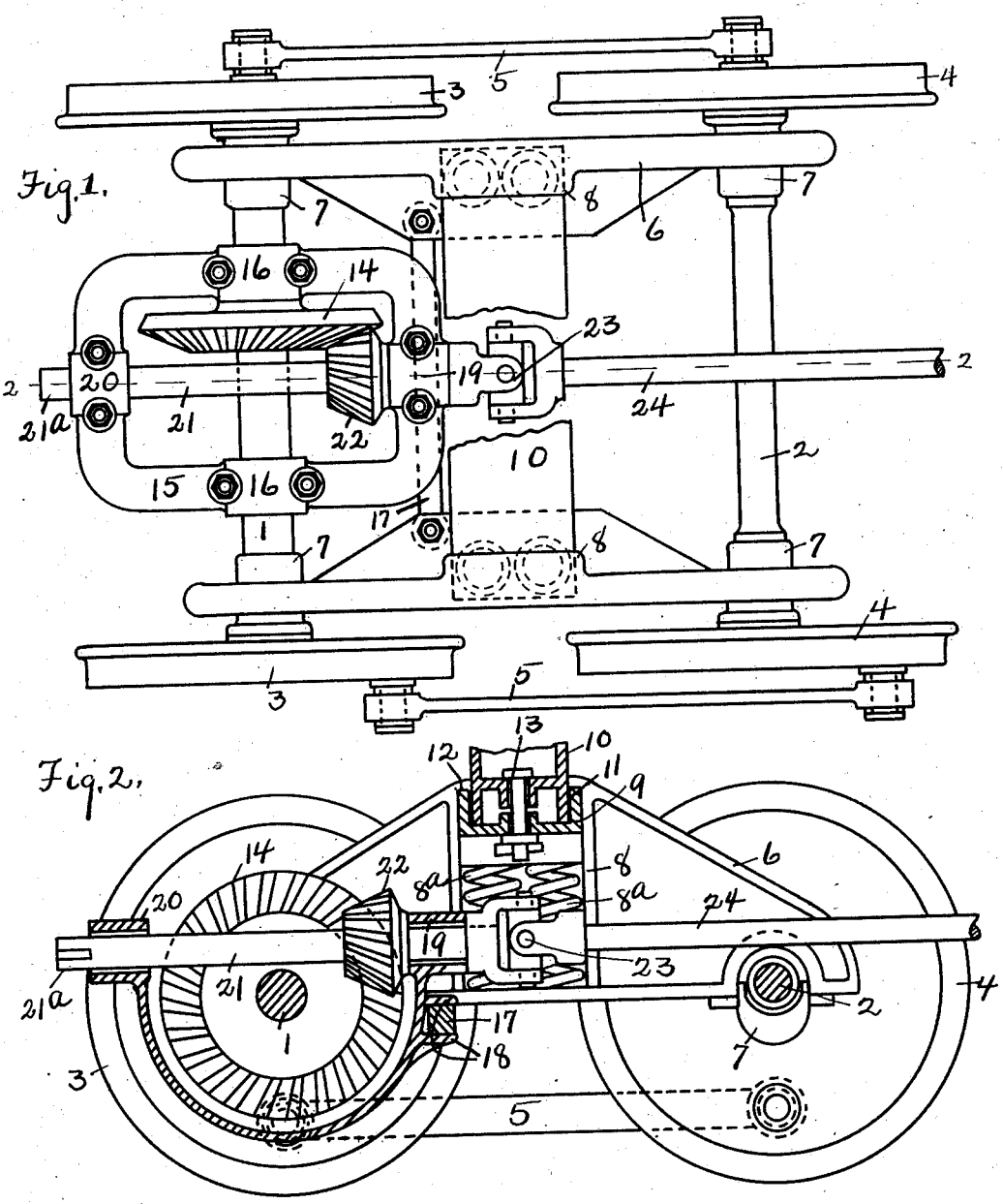
WITNESSES:
Blanche Hartman
Vinnie C. Hess
INVENTOR.
John Walton
BY
ATTORNEY.

UNITED STATES PATENT OFFICE.

JOHN WALTON, OF ERIE, PENNSYLVANIA.

LOCOMOTIVE-TRUCK.

1,025,600.  Specification of Letters Patent.  Patented May 7, 1912.

Application filed January 4, 1911. Serial No. 600,703.

*To all whom it may concern:*

Be it known that I, JOHN WALTON, a citizen of the United States, residing at Erie, in the county of Erie and State of Pennsylvania, have invented new and useful Improvements in Locomotive-Trucks, of which the following is a specification.

This invention relates to locomotive trucks, and consists in certain improvements in the construction thereof as will be hereinafter fully described and pointed out in the claims.

More particularly, the invention relates to trucks for geared locomotives of a type ordinarily used for lumbering. In these locomotives the driving shaft to which the engine is attached usually runs lengthwise of the locomotive so as to drive several trucks, and also to facilitate the connection between the driving mechanism of the locomotive with the driving scheme on the different logging cars.

The invention is illustrated in the accompanying drawings as follows:

Figure 1 is a plan view of such a truck. Fig. 2 a section on the line 2—2 in Fig. 1.

1 marks one of the axles of the truck, 2 the other axle. The wheels 3 and 4 are fixed on these axles, and the wheels and axles have a driving connection through the connecting rods 5.

The side frames 6 are mounted on the bearing 7 on the axles 1 and 2. They have the bolster pockets 8 which are arranged in these side frames, and the springs 8ᵃ are arranged in these pockets. The truck bolster 9 has its ends in these pockets resting on the springs 8ᵃ. The locomotive bolster 10 rests on the bolster 9, the bolster 9 having a socket 12 at the center in which the projection 11 of the bolster is swiveled. The king pin 13 locks the two bolsters together.

The skew gear 14 is fixed on the axle 1. The bearing in the frame 15 has a bearing 16 on the axle 1. A bar 17 extends from the side frame 6 to the other side frame, and the frame 15 is connected with this bar 17 by means of the ears 18, this locks the frame 15 from turning on the axle 1. Bearings 19 and 20 are arranged lengthwise of the truck, one in front of and one behind the axle 1. The shaft 21 is journaled in these bearings and extends across the axle either above or below the axle, as shown above the axle. A skew gear 22 is fixed on the shaft 21 between the bearings 19 and 20 and meshes the skew gear 14 on the axle. The shaft 21 has an extension 21ᵃ by means of which the shaft may be extended either for the purpose of the engine or cars. A universal joint 23 is arranged at the end of the shaft 21 directly in line with the axis of the swivel bolster, and the shaft is extended beyond the universal joint by the shaft 24.

By making the universal joint 23 directly in line with the axis of the bolster, the swinging of the truck does not change the length of the combined shafts 21 and 24 so that slip joints such as are ordinarily used may be dispensed with. This is a very important feature of this construction. By having a bearing at both sides of the axle 1, the gear 22 is so supported as to prevent any binding in the bearings.

What I claim as new is:

1. In a locomotive truck, the combination of a driving axle; a skew gear on the axle; a bearing frame having a bearing on the axle and bearings lengthwise of the truck to the front and rear of the axle; a shaft in the frame bearings and extending across the axle; a skew gear on the shaft meshing the skew gear on the axle; a truck frame; a connection between the truck frame and the bearing frame; a swivel bolster on the truck frame; and a universal joint in said shaft at the axis of the bolster.

2. In a locomotive truck, the combination of a driving axle; a skew gear on the axle; a bearing frame having a bearing on the axle and bearings lengthwise of the truck to the front and rear of the axle; a shaft in the frame bearings and extending across the axle; a skew gear on the shaft meshing the skew gear on the axle; a truck frame; a connection between the truck frame and the bearing frame; a swivel bolster on the truck frame; a universal joint in said shaft at the axis of the bolster; a second axle on the truck, the axis of the bolster being between the axles; and a connecting rod forming a driving connection between the axles.

In testimony whereof I have hereunto set my hand in the presence of two subscribing witnesses.

JOHN WALTON.

Witnesses:
C. D. HIGBY,
BLANCHE HARTMAN.

Copies of this patent may be obtained for five cents each, by addressing the "Commissioner of Patents, Washington, D. C."